United States Patent
Ohnuki et al.

(10) Patent No.: US 8,645,759 B2
(45) Date of Patent: Feb. 4, 2014

(54) DEBUGGING MECHANISM HAVING AN OR CIRCUIT FOR TRIGGERING STORAGE OF ARITHMETIC OPERATION DATA WHENEVER A VALID CONTROL SIGNAL IS RECEIVED OR A CLOCK-BASED COUNTER OVERFLOWS

(75) Inventors: Yoshiteru Ohnuki, Kawasaki (JP); Hideo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 950 days.

(21) Appl. No.: 12/198,704

(22) Filed: Aug. 26, 2008

(65) Prior Publication Data

US 2009/0063830 A1    Mar. 5, 2009

Related U.S. Application Data

(63) Continuation of application No. PCT/JP2006/303652, filed on Feb. 27, 2006.

(51) Int. Cl.
G06F 11/34     (2006.01)
G06F 17/40     (2006.01)

(52) U.S. Cl.
USPC .............. 714/30; 712/227; 702/187; 717/124

(58) Field of Classification Search
USPC .............. 712/227; 702/187; 714/30; 717/124
See application file for complete search history.

(56) References Cited

U.S. PATENT DOCUMENTS

| | | | |
|---|---|---|---|
| 5,715,435 A * | 2/1998 | Ikei ................................. 703/23 |
| 6,584,586 B1 * | 6/2003 | McCoy ........................... 714/45 |
| 6,741,953 B2 * | 5/2004 | Hernandez et al. ........... 702/187 |
| 2006/0026470 A1 | 2/2006 | Yamashita et al. | |

FOREIGN PATENT DOCUMENTS

| | | |
|---|---|---|
| JP | 2000-10939 | 1/2000 |
| JP | 2000-194679 | 7/2000 |
| JP | 2001142733 A * | 5/2001 |
| JP | 2006-40172 | 2/2006 |

* cited by examiner

Primary Examiner — David J Huisman
(74) Attorney, Agent, or Firm — Staas & Halsey LLP

(57) ABSTRACT

A debugging mechanism receives arithmetic operation data inputs for causing an arithmetic unit to perform an arithmetic operation, and a control signal used for the arithmetic operation. The debugging mechanism includes a debug control unit which includes (1) a counter that performs a counting operation cyclically according to the processor clock operation, and (2) an OR circuit that receives the control signal and a counter signal that is output when the counter value becomes a specific value, and outputs an output signal generated by performing a logical OR operation of the control signal and the counter signal. The debugging mechanism also includes a debug storage unit which stores the arithmetic operation data, the counter value, and the control signal when the output of the OR circuit is valid.

7 Claims, 19 Drawing Sheets

| A | 1 | 0 | 1 | 0 | 1 | 0 |
|---|---|---|---|---|---|---|
| COUNTER VALUE | 010 | 101 | 000 | 010 | 011 | 111 |
| V_A | 1 | 1 | 1 | 1 | 1 | 1 |

F I G. 3 A

| B | 0 | 0 | 0 | 1 | 0 | 0 |
|---|---|---|---|---|---|---|
| COUNTER VALUE | 010 | 011 | 100 | 110 | 000 | 111 |
| V_B | 1 | 1 | 1 | 1 | 0 | 1 |

F I G. 3 B

| C | 1 | 0 | 1 | 0 | 0 | 0 |
|---|---|---|---|---|---|---|
| COUNTER VALUE | 010 | 000 | 011 | 100 | 101 | 111 |
| V_C | 1 | 0 | 1 | 1 | 1 | 1 |

F I G. 3 C

| COUNTER VALUE | 010 | 011 | 100 | 101 | 110 | 111 | 000 | 001 | 010 | 011 | 100 | 101 | 110 | 111 |
|---|---|---|---|---|---|---|---|---|---|---|---|---|---|---|
| A | 1 |   |   | 0 |   |   | 1 |   | 0 | 1 |   |   |   | 0 |
| B | 0 | 0 | 0 |   | 1 |   | 0 |   |   |   |   |   |   | 0 |
| C | 1 |   |   |   |   |   | 0 |   |   | 1 | 0 | 0 |   | 0 |

FIG. 4

| A | 1 | 0 | 0 | 0 | 0 | 0 |
|---|---|---|---|---|---|---|
| COUNTER VALUE | 011 | 111 | 000 | 000 | 000 | 000 |
| V_A | 1 | 1 | 0 | 0 | 0 | 0 |

FIG. 5A

| B | 0 | 0 | 0 | 0 | 0 | 0 |
|---|---|---|---|---|---|---|
| COUNTER VALUE | 000 | 111 | 000 | 000 | 000 | 000 |
| V_B | 1 | 1 | 0 | 0 | 0 | 0 |

FIG. 5B

| C | 0 | 0 | 0 | 0 | 0 | 0 |
|---|---|---|---|---|---|---|
| COUNTER VALUE | 101 | 111 | 000 | 000 | 000 | 000 |
| V_C | 1 | 1 | 0 | 0 | 0 | 0 |

FIG. 5C

| COUNTER VALUE | 000 | 001 | 010 | 011 | 100 | 101 | 110 | 111 | 000 | 001 | 010 | 011 |
|---|---|---|---|---|---|---|---|---|---|---|---|---|
| A   | 0 | 1 | 0 | 0 | 0 | 0 | 0 | 0 | 1 | 0 | 0 | 0 |
| V_A | 0 | 1 | 0 | 0 | 1 | 0 | 1 | 1 | 1 | 0 | 0 | 0 |
| B   | 1 | 0 | 0 | 0 | 0 | 1 | 0 | 0 | 0 | 0 | 0 | 0 |
| V_B | 1 | 1 | 1 | 1 | 0 | 1 | 0 | 0 | 0 | 0 | 0 | 0 |
| C   | 1 | 1 | 0 | 0 | 0 | 0 | 0 | 0 | 1 | 0 | 0 | 0 |
| V_C | 1 | 1 | 0 | 0 | 0 | 0 | 0 | 0 | 1 | 1 | 1 | 0 |

FIG. 7

| COUNTER VALUE | 001 | 100 | 110 | 111 | 000 | 011 |
|---|---|---|---|---|---|---|
| A | 1 | 0 | 1 | 0 | 1 | 0 |
| V_A | 1 | 1 | 1 | 1 | 1 | 1 |

FIG. 8A

| COUNTER VALUE | 001 | 010 | 011 | 101 | 000 | 011 |
|---|---|---|---|---|---|---|
| B | 0 | 0 | 0 | 1 | 0 | 0 |
| V_B | 1 | 1 | 1 | 1 | 0 | 1 |

FIG. 8B

| COUNTER VALUE | 000 | 001 | 000 | 001 | 010 | 011 |
|---|---|---|---|---|---|---|
| C | 1 | 1 | 1 | 0 | 0 | 0 |
| V_C | 1 | 1 | 1 | 1 | 1 | 1 |

| COUNTER VALUE | 000 | 001 | 010 | 011 | 100 | 101 | 110 | 111 | 000 | 001 | 010 | 011 |
|---|---|---|---|---|---|---|---|---|---|---|---|---|
| A   |   | 1 |   |   | 0 |   | 1 | 0 | 1 |   |   | 0 |
| V_A |   | 1 |   |   | 1 | 1 | 1 | 1 | 1 |   |   | 1 |
| B   |   | 0 | 1 | 0 |   |   |   |   | 0 |   |   | 0 |
| V_B |   | 1 | 1 | 1 |   |   |   |   | 0 |   |   | 1 |
| C   | 1 | 1 |   |   |   |   |   |   | 1 | 0 | 0 | 0 |
| V_C | 1 | 1 |   |   |   |   |   |   | 1 | 1 | 1 | 1 |

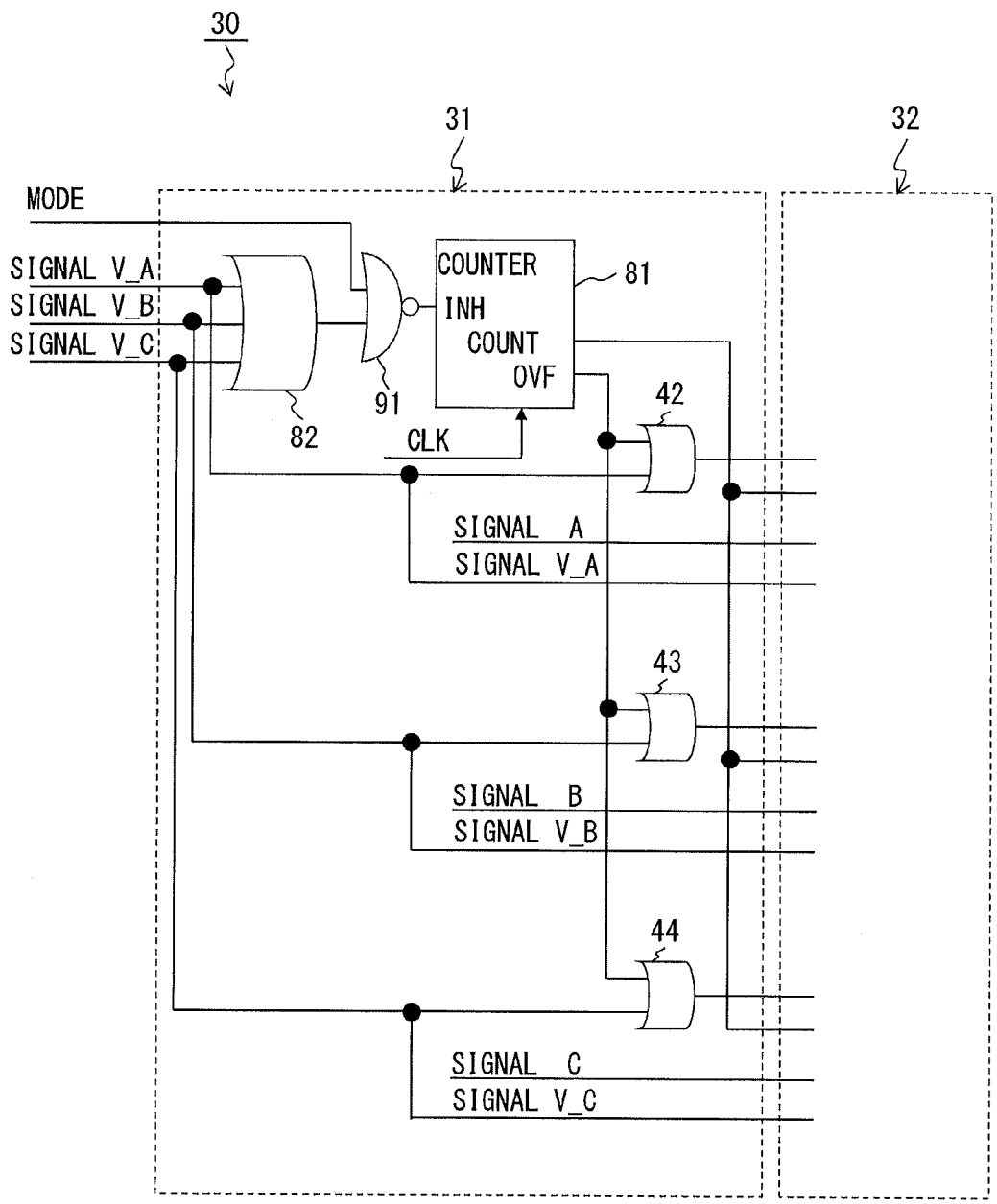
F I G. 10

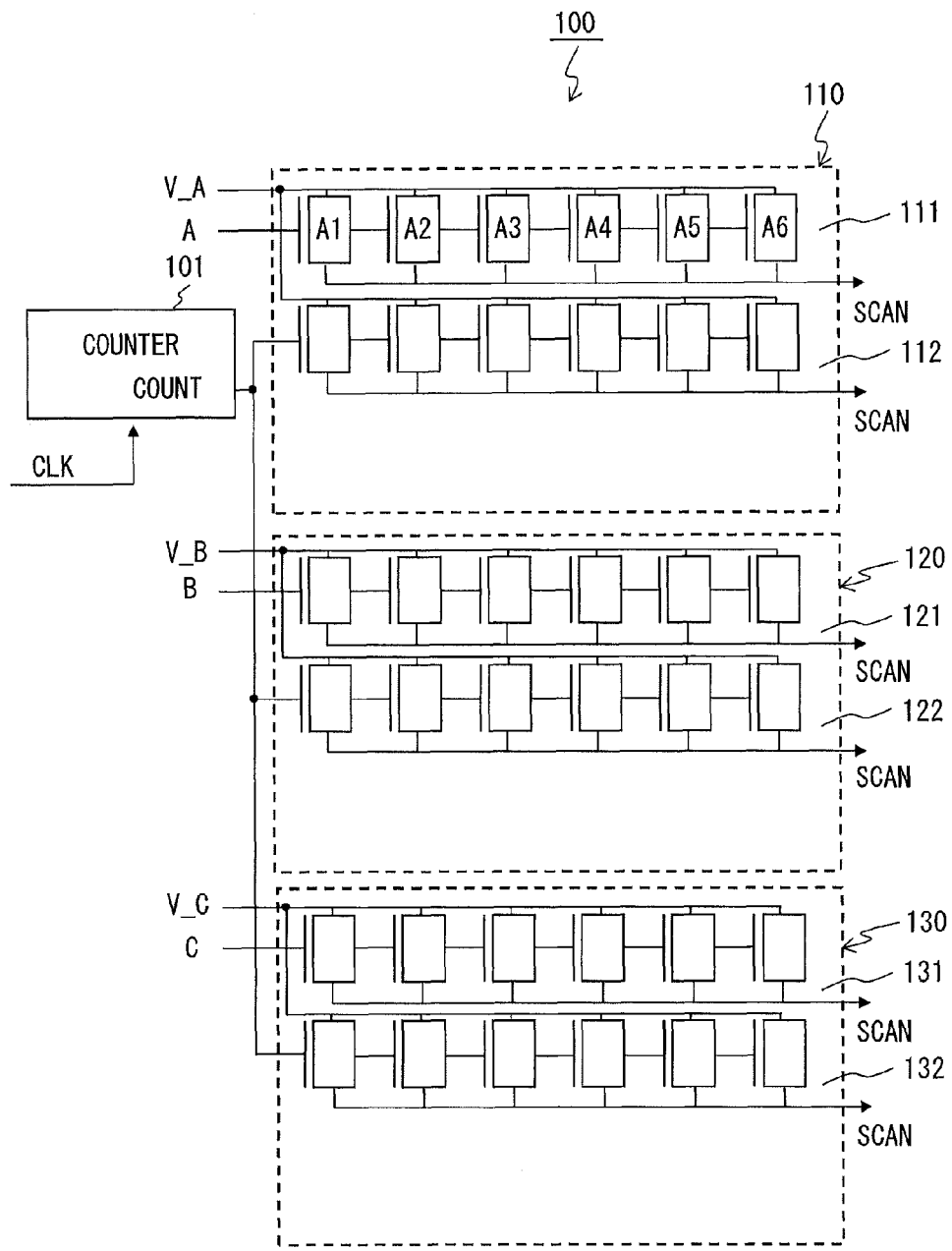
F I G. 1 2   RELATED ART

| A | 0 | 0 | 1 | 0 | 0 | 0 | 0 | 0 | 1 | 0 | 0 | 0 | 0 | 0 | 0 | 0 |
|---|---|---|---|---|---|---|---|---|---|---|---|---|---|---|---|---|
| COUNTER VALUE | 000 | 001 | 010 | 011 | 100 | 101 | 110 | 111 | 000 | 001 | 010 | 011 | 100 | 101 | 110 | 111 |
| V_A | 0 | 0 | 1 | 0 | 0 | 1 | 0 | 1 | 1 | 0 | 1 | 1 | 0 | 0 | 0 | 1 |

FIG. 13A  RELATED ART

| B | 1 | 0 | 0 | 0 | 0 | 0 | 1 | 0 | 0 | 0 | 0 | 0 | 0 | 0 | 0 | 0 |
|---|---|---|---|---|---|---|---|---|---|---|---|---|---|---|---|---|
| COUNTER VALUE | 000 | 001 | 010 | 011 | 100 | 101 | 110 | 111 | 000 | 001 | 010 | 011 | 100 | 101 | 110 | 111 |
| V_B | 1 | 0 | 1 | 1 | 1 | 0 | 1 | 0 | 0 | 0 | 0 | 0 | 0 | 0 | 0 | 1 |

FIG. 13B  RELATED ART

| C | 1 | 0 | 0 | 0 | 0 | 0 | 0 | 0 | 0 | 0 | 0 | 1 | 0 | 0 | 0 | 0 |
|---|---|---|---|---|---|---|---|---|---|---|---|---|---|---|---|---|
| COUNTER VALUE | 000 | 001 | 010 | 011 | 100 | 101 | 110 | 111 | 000 | 001 | 010 | 011 | 100 | 101 | 110 | 111 |
| V_C | 1 | 0 | 1 | 0 | 0 | 0 | 0 | 0 | 0 | 0 | 0 | 1 | 1 | 1 | 0 | 1 |

FIG. 13C  RELATED ART

| A | 1 | 0 | 1 | 0 | 1 | 0 |
|---|---|---|---|---|---|---|
| COUNTER VALUE | 010 | 101 | 000 | 010 | 011 | 111 |

F I G.  1 4 A    RELATED ART

| B | 1 | 0 | 0 | 0 | 1 | 0 |
|---|---|---|---|---|---|---|
| COUNTER VALUE | 000 | 010 | 011 | 100 | 110 | 111 |

F I G.  1 4 B    RELATED ART

| C | 1 | 1 | 1 | 0 | 0 | 0 |
|---|---|---|---|---|---|---|
| COUNTER VALUE | 000 | 010 | 011 | 100 | 101 | 111 |

| COUNTER VALUE | 000 | 001 | 010 | 011 | 100 | 101 | 110 | 111 | 000 | 001 | 010 | 011 | 100 | 101 | 110 | 111 |
|---|---|---|---|---|---|---|---|---|---|---|---|---|---|---|---|---|
| A |  |  | 1 |  |  | 0 |  |  | 1 |  |  | 1 |  |  |  | 0 |
| B | 1 |  | 0 | 0 | 0 |  | 1 |  |  |  |  |  | 0 |  |  | 0 |
| C | 1 |  | 1 |  |  |  |  |  |  |  |  |  |  | 0 |  | 0 |

FIG. 15B RELATED ART

| COUNTER VALUE | 000 | 001 | 010 | 011 | 100 | 101 | 110 | 111 | 000 | 001 | 010 | 011 | 100 | 101 | 110 | 111 |
|---|---|---|---|---|---|---|---|---|---|---|---|---|---|---|---|---|
| A |  |  | 1 |  |  | 0 |  |  | 1 |  |  | 1 |  |  |  | 0 |
| B |  |  |  |  | 0 |  | 1 | 0 | 1 |  | 0 | 0 | 0 |  | 1 | 0 |
| C | 1 |  | 1 |  |  |  |  |  |  |  |  | 1 | 0 | 0 |  | 0 |

FIG. 15C RELATED ART

| COUNTER VALUE | 000 | 001 | 010 | 011 | 100 | 101 | 110 | 111 | 000 | 001 | 010 | 011 | 100 | 101 | 110 | 111 |
|---|---|---|---|---|---|---|---|---|---|---|---|---|---|---|---|---|
| A |  |  | 1 |  |  | 0 |  |  | 1 |  |  | 1 |  |  |  | 0 |
| B | 1 |  | 0 | 0 | 0 |  | 1 | 0 |  |  |  |  |  |  |  |  |
| C | 1 |  | 1 | 1 | 0 | 0 |  | 0 |  |  |  |  |  |  |  |  |

DEBUGGING MECHANISM HAVING AN OR CIRCUIT FOR TRIGGERING STORAGE OF ARITHMETIC OPERATION DATA WHENEVER A VALID CONTROL SIGNAL IS RECEIVED OR A CLOCK-BASED COUNTER OVERFLOWS

CROSS REFERENCE TO RELATED APPLICATION

This application is a continuation application of international PCT application No. PCT/JP2006/303652 filed on Feb. 27, 2006.

BACKGROUND OF THE INVENTION

1. Field of the Invention

The present invention relates to a debugging mechanism for a processor.

2. Description of the Related Art

The increase in the degree of integration and complexity in the logic of processors has been remarkable in recent years, causing the work time for debugging to be continually increased. In a debugging of an arithmetic unit of a processor carried out Out-of-Order, it is important to know information (i.e., the history of arithmetic operations) indicating how and in what sequence each arithmetic unit has performed execution, thus requiring a configuration for recording and reading the information. Currently, a method widely used as one method for a debugging is to add a scan circuit to a latch incorporated in a processor and read the latch information. As a specific example, there is a known method to add a scan circuit to a latch incorporated in, for example, a JTAG (Joint Test Action Group)-compliant processor and to read the information from the latch.

As a related art, there is a debugging mechanism employing a plurality of latches each equipped with a scan circuit and each recording the arithmetic operation information while shifting the information, thereby retaining the arithmetic operation execution information within the processor at a plurality of timings. The debugging mechanism according to the related art records the content of the arithmetic operation execution and the timing of the arithmetic operation execution of each arithmetic unit. That is, the related art provides a counter and records the counter value and the signal of a recording target (i.e., arithmetic operation data). This configuration enables a person performing debugging or someone else to know what arithmetic operation has been executed and in what sequence each of the arithmetic units has performed execution, just by scanning the recorded data. It has not been possible to know, however, the execution intervals (i.e., cycle intervals) between the individual arithmetic operations of each arithmetic unit, or to know the relative execution order of a plurality of arithmetic units (i.e., in some cases judging them clearly is not possible).

FIG. 12 exemplifies the configuration of a debugging mechanism according to the related art described above.

The debugging mechanism 100 shown in FIG. 12 comprises a counter 101, and individual storage units 110, 120 and 130, corresponding to the respective arithmetic units. It is assumed here that there are three arithmetic units (assuming the arithmetic units X, Y and Z, although none of them is shown in a drawing herein). The arithmetic unit X executes a prescribed arithmetic operation on the basis of the signal of recording target (noted as "record target signal" hereinafter) A (i.e., arithmetic-operation-use input data) when control signal V_A, which is a startup control signal (VALID), turns to valid ("1"). Likewise, a record target signal B and a control signal V_B are input into the arithmetic unit Y, and a record target signal C and a control signal V_C are input into the arithmetic unit Z.

Further, since it is assumed here that the counter 101 is a 3-bit counter, a 3-bit count value is output from the COUNT terminal of the counter 101. Taking a storage unit 110 corresponding to the arithmetic unit X as an example, the storage unit 110 comprises a shift register 111, which receives a record target signal A as an input, and when the control signal V_A is "1", stores the record target signal A and shifts it by one; and a shift register 112, which receives the count value as input, and when the control signal V_A is "1", stores the count value and shifts it by one. The other storage units 120 and 130 are likewise configured, and they are different only in the sense that the input and stored data and the control signal are the record target signal B and the control signal V_B, and the input and stored data and the control signal are the record target signal C and the control signal V_C.

Each shift register of each storage unit has the same configuration, and the only exception is that input data are different, and therefore the description here is provided by exemplifying the shift register 111. The shift register 111 is constituted by six registers, i.e., registers A1, A2, A3, ..., A6, in which a discretionary record target signal A externally input into the debugging mechanism 100 is first stored in the register A1 then is shifted to the register A2 when the next record target signal A is stored in the register A1, and it is shifted to the registers A3, A4, A5 and A6 in this order and is eventually shifted out. The control signal V_A is also input into the shift register 112, so that, at every time the control signal V_A turns to "1", the present count value of the counter 101 is stored in the shift register 112 anew and the count value already stored in each register of the shift register 112 is shifted to the immediate next registers.

Then, the data stored in each of the shift registers 111 through 132 is externally read (scanned) at a discretionary timing. For example, when it is assumed that the values and the timings of the record target signals A through C and the control signals V_A through V_C are as shown in FIGS. 13A through 13C, the data scanned from the shift registers 111 through 132 are as shown in FIGS. 14A through 14C. That is, each of the storage units 110 through 130 has records of the record target signal and the counter value when the control signal is "1".

Here, the counter 101 is a 3-bit counter, as described above, and therefore the counter counts up sequentially, i.e., 000, 001, 010 and so on, resets the count value when it reaches 111 and then again counts up in the sequence 000, 001, 010 and so on (which is called a cyclic counting). The storage units 110, 120 and 130 each store, and shift, the input record target signal A and the count value only when the input control signal to the unit is "1". Therefore, for example, the storage unit 110 stores/shifts the record target signal A and the count value only when the count values are 010, 101, 000, 010, 011 and 111 (refer to FIG. 13A), and therefore the storage content of the storage unit 110 which is read out by scanning afterwards is as shown in FIG. 14A.

Note that a clock CLK input to the counter 101 is an internal clock of the processor and that the individual arithmetic units X through Z are also controlled in accordance with the clock CLK, and therefore the counter 101 will operate synchronously with these arithmetic operations. Further note that, referring to FIGS. 14A through 14C, each piece of data shown leftmost (noted as "leftmost data" hereinafter) in the figure represents data stored in the register shown on the rightmost side (i.e., the register A6 in the case of the shift register 111) from among the individual shift registers shown in FIG. 12. That is, the leftmost data represents the oldest piece of data from among the recorded data. The pieces of data shown on the rightmost side in the figure as shown in FIGS. 14A through 14C are the newest pieces of storage information (i.e., the data stored in register A1 in the case of the shift register 111). The number of memory elements of each shift register shown in FIG. 12 is six, and therefore the data in the record target signal A="1" and the count value="010" shown, as an example, in FIG. 14A will be shifted out when a further piece of data is recorded anew.

Here, assume that the person performing debugging considers the operating order of each arithmetic unit on the basis of data read (scanned) from the storage units 110, 120 and 130, as with actual debugging. FIGS. 15A through 15C show the operating order of each arithmetic unit, which may be able to be judged from the storage content shown in FIGS. 14A through 14C. Note that each of FIGS. 15A through 15C shows the values of record target signals newly recorded at the time at which a new piece of data is recorded in each shift register.

Since the actual operating orders are as shown in FIGS. 13A through 13C, FIG. 15A indicates a correct judgment result. From the storage contents shown in FIGS. 14A through 14C, however, a judgment as shown in FIG. 15B or 15C can be made and therefore the person performing debugging cannot know which judgment result is correct.

The reason why such a situation is brought about is that the counter 101 is cyclically operated as described above. As an example, even if the count value="101" is recorded, sometimes it cannot be judged to which cycle the count value="101" belongs. Of course, it is possible to make a judgment in some cases. In the example shown here, the record target signal A can be clearly judged, and the same judgment result is indicated for all of FIGS. 15A through 15C. This is because the first count value="000" in the second cycle is recorded by chance in the case of the record target signal A, and this enables the judgment that the previous record data is the first cycle and the following record data is the second cycle to be made. However, this is based on the fact that the counter 101 is operated only for the second cycle, and therefore, if it is operated for the third cycle and thereafter, the judgment will be disabled (This is because, for example, no data is recorded in the second cycle in some cases, and all pieces of record data following the count value "000" might be the data recorded in the third cycle).

As for the case of the record target signals B and C, even if it is premised that the counter 101 is operated only until the second cycle, there are plural possible patterns as exemplified in FIGS. 15A through 15C, and hence it cannot be judged which of these is correct. Taking the record target signal B as an example, only the data of the count value="111" stored last is the data of the second cycle and all other pieces of data are ones recorded in the first cycle, and this is correctly shown in FIG. 15A. However, there are possibilities that all pieces of data are of the second cycle as shown in FIG. 15B and that all pieces of data are of the first cycle as shown in FIG. 15C (and in addition, other patterns are also possible).

Objects of the present invention, related to a debugging mechanism retaining the arithmetic operation execution information pertaining to a processor, are to provide a debugging mechanism for recording an operation history of each arithmetic unit so as to judge clearly the execution sequence and the cycle interval for each arithmetic unit or so as to judge clearly a relative execution order of a plurality of arithmetic units, and to provide an arithmetic operation unit, a processor and the like, which comprise the debugging mechanism.

SUMMARY OF THE INVENTION

According to the present invention, a debugging mechanism receiving inputs of arithmetic operation data arithmetic unit to perform an arithmetic operation, and a control signal used for the arithmetic operation includes: a debug control unit that includes a counter performing a counting operation cyclically according to the arithmetic operation; and an OR circuit receiving inputs of the control signal and a signal that is output when the counter value of the counter is a specific counter value; and a debug storage unit stores the arithmetic operation data, the counter value and the control signal when the arithmetic operation data, the output of the OR circuit and the counter value are input and when the output of the OR circuit is valid.

While the debug storage unit of the debugging mechanism basically stores the arithmetic operation data and the counter value when a control signal corresponding to the storage unit is valid, the arithmetic operation data and the counter value are stored as a check point even if the control signal is not valid when the counter value of the counter is a specific counter value. When debugging is carried out later by scanning the data stored in the debug storage unit, it is possible to discern, on the basis of the check point, to which cycle (i.e., the nth cycle) the stored arithmetic operation data belongs. That is, it is possible to record the operation history of the arithmetic unit so as to judge clearly the execution order and the cycle interval of the arithmetic unit, or a relative execution order of a plurality of the arithmetic unit.

A signal that is output when the counter value of the counter is a specific counter value may be, for example, an overflow signal output from the counter or the output of a comparator receiving, as inputs, a counter value output from the counter and the specific counter value.

Further, a configuration may be such that, for example, instead of the counter always performing a counting operation synchronously with the arithmetic operation, it performs the counting operation when any one or more of the control signals are valid.

This configuration makes it possible to avoid a situation in which data is in vain stored as the check point even if a clock operating the counter cannot be stopped immediately after the completion of a test-use arithmetic operation.

Further, a configuration may be such that, for example, the counter operates synchronously with the arithmetic operation, or operates when at least one of a plurality of the control signal is valid, in accordance with an externally input mode signal.

This configuration makes it possible to record data for debugging using an operating method in accordance with the needs of the situation.

BRIEF DESCRIPTION OF THE DRAWINGS

FIG. 3A exemplifies data stored in each storage unit equipped in the debugging mechanism shown in FIG. 2A;

FIG. 3B exemplifies data stored in each storage unit equipped in the debugging mechanism shown in FIG. 2B;

FIG. 3C exemplifies data stored in each storage unit equipped in the debugging mechanism shown in FIG. 2C;

FIG. 4 is a diagram showing the operation content and the timing of each arithmetic unit, which are judged on the basis of the data shown in FIGS. 3A through 3C;

FIG. 5A is a diagram showing a situation in which the record data shown in FIG. 3A almost disappears;

FIG. 5B is a diagram showing a situation in which the record data shown in FIG. 3B almost disappears;

FIG. 5C is a diagram showing a situation in which the record data shown in FIG. 3C almost disappears;

FIG. 7 is a diagram showing the operation timing of a counter according to embodiment 2;

FIG. 8A exemplifies data stored in each storage unit equipped in the debugging mechanism shown in FIG. 6A;

FIG. 8B exemplifies data stored in each storage unit equipped in the debugging mechanism shown in FIG. 6B;

FIG. 8C exemplifies data stored in each storage unit equipped in the debugging mechanism shown in FIG. 6C;

FIG. 9 is a diagram showing the operating order of individual arithmetic units judged from the record data shown in FIGS. 8A through 8C;

FIG. 10 exemplifies the configuration of a debugging mechanism according to preferred embodiment 3;

FIG. 12 exemplifies the configuration of a debugging mechanism according to a conventional technique;

FIG. 13A exemplifies the values and the timings of a record target signal A and a control signal V_A;

FIG. 13B exemplifies the values and the timings of a record target signal B and a control signal V_B;

FIG. 13C exemplifies the values and the timings of a record target signal C and a control signal V_C;

FIG. 14A shows data stored in a shift register in the example shown in FIG. 13A;

FIG. 14B shows data stored in a shift register in the example shown in FIG. 13B;

FIG. 14C shows data stored in a shift register in the example shown in FIG. 13C;

FIG. 15A is a diagram showing the operating order of individual arithmetic units estimable from the storage content shown in FIG. 14A;

FIG. 15B is a diagram showing the operating order of individual arithmetic units estimable from the storage content shown in FIG. 14B; and FIG. 15C is a diagram showing the operating order of individual arithmetic units estimable from the storage content shown in FIG. 14C.

DESCRIPTION OF THE PREFERRED EMBODIMENTS

In the following, descriptions of embodiments of the present invention will be described by referring to the accompanying drawings.

Figure 1:
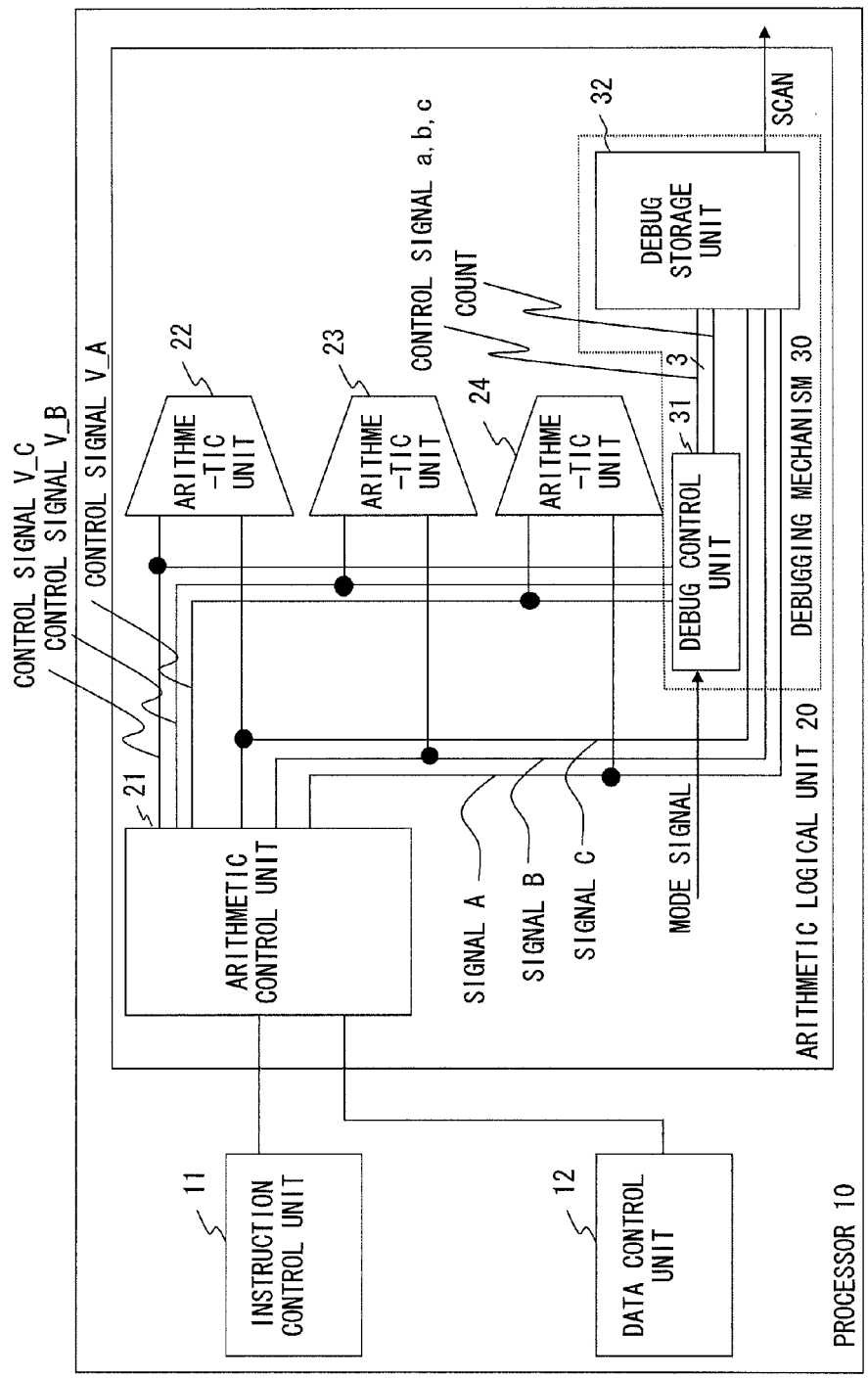
FIG. 1 is the outline configuration diagram of an arithmetic operation unit comprising a debugging mechanism according to the present embodiment and a processor comprising this operation unit.

FIG. 1 is the outline configuration diagram of an arithmetic operation unit comprising a debugging mechanism according to the present embodiment and a processor comprising this arithmetic operation unit.

Referring to FIG. 1, the processor 10 comprises an instruction control unit 11, a data control unit 12, and an arithmetic logical unit 20. The arithmetic logical unit 20 comprises an arithmetic control unit 21, arithmetic units 22, 23 and 24, and a debugging mechanism 30. The debugging mechanism 30 comprises a debug control unit 31 and a debug storage unit 32.

In the arithmetic logical unit 20, the arithmetic control unit 21 controls the arithmetic units 22, 23 and 24 on the basis of a control signal issued from the instruction control unit 11. The individual arithmetic units 22, 23 and 24 each execute a prescribed arithmetic operation ("arithmetic operation" is also simply noted as "operation" hereinafter) using data input from the data control unit 12 to each arithmetic unit (i.e., operation-use input data) by way of the arithmetic control unit 21, in accordance with control signals V_A, V_B and V_C, which are output from the arithmetic control unit 21. In the example shown in FIG. 1, the signals A, B and C are input into the arithmetic units 22, 23 and 24, respectively, as operation-use input data. These signals A, B and C are also input into the debug storage unit 32 of the debugging mechanism 30. Likewise, the control signals V_A, V_B and V_C, which are input into the respective arithmetic units 22, 23 and 24, are also input into the debug control unit 31 of the debugging mechanism 30.

Note that the configuration shown in FIG. 1 is merely an example. The debug storage unit 32 is for recording the history of arithmetic operations (i.e., operation data and execution timing) as in the case of the related art. The above described example uses operation-use input data as the operation data to be recorded; this is, however, not an essential factor, and, instead, the operation data to be recorded may use the operation execution results of the arithmetic units 22, 23 and 24. Alternatively, both the operation-use input data and the operation execution result may be recorded as operation data. Of course, in such a situation signal lines need to be equipped (not shown in a drawing herein) for inputting the outputs of the arithmetic units 22, 23 and 24 to the debug storage unit 32.

The debug control unit 31 outputs a counter value output from a counter incorporated in the debug control unit 31 to the debug storage unit 32 as in the case of the related art. The debug control unit 31 also generates control signals a, b and c on the basis of the input control signals V_A, V_B and V_C, respectively, and outputs the generated control signals to the debug storage unit 32. Note that various kinds of signals are output from the arithmetic control unit 21 so that each of the control signals V_A, V_B and V_C is a startup control signal (VALID) of each arithmetic unit as one of the various control signals. Note that the MODE signal shown in FIG. 1 is required for preferred embodiment 3 described later; however, it is not required for the other preferred embodiments. Meanwhile, a clock CLK (not shown in a drawing herein), which is an internal clock of the processor 10, is also input into the debug control unit 31, as in the case of the related art.

The debugging mechanism 30 is for recording the history of operations (i.e., operation data and execution timing) of each arithmetic unit, for making it possible to carry out debugging effectively by specifically recording only generally useful information, and for recording information so as to judge the execution order and the cycle interval of each arithmetic unit or a relative execution order of a plurality of arithmetic units clearly and accurately in the debugging.

Figure 2A:
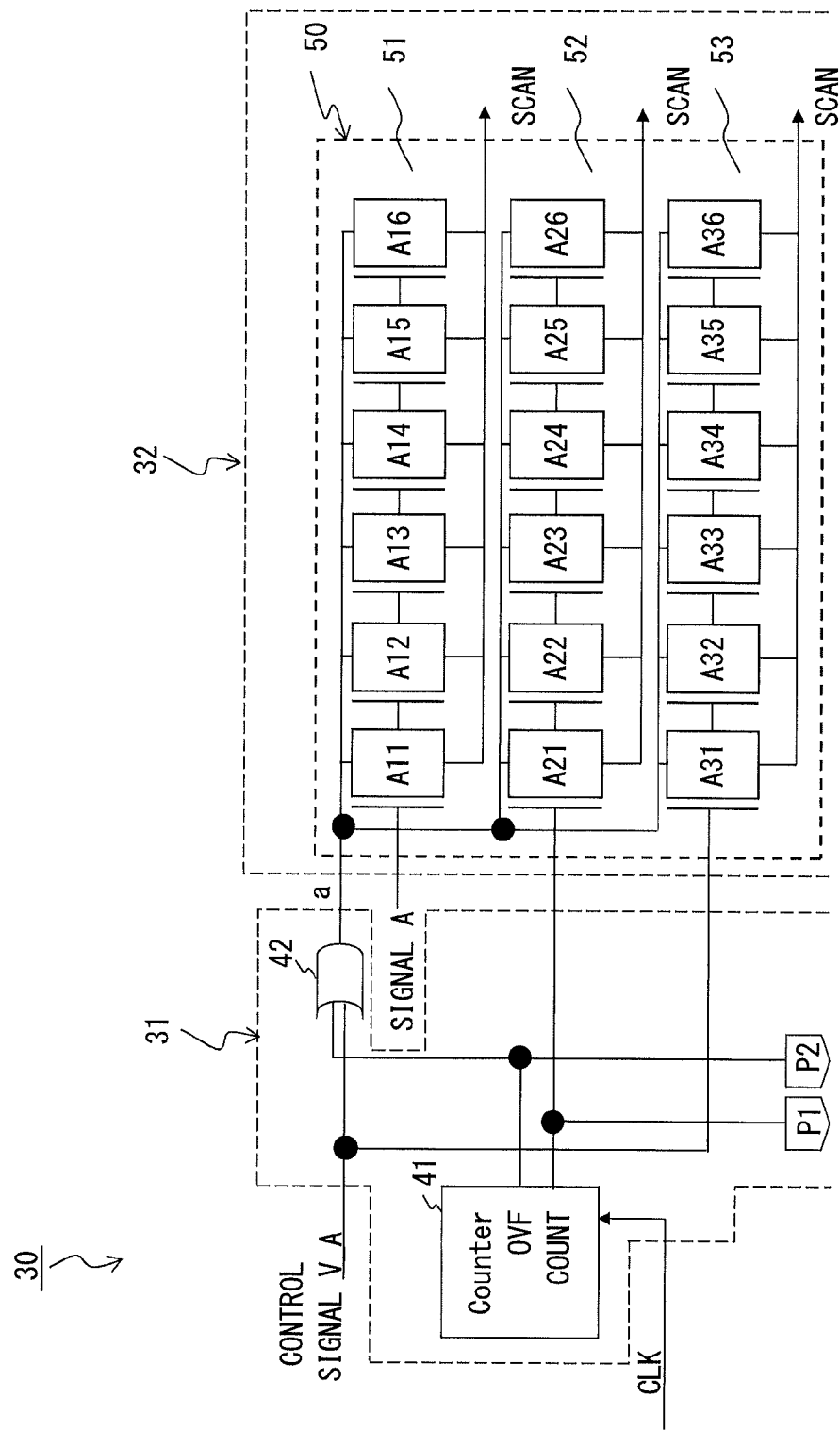
FIGS. 2A, 2B and 2C each exemplify the configuration of a debugging mechanism according to preferred embodiment 1.
Figure 2B:
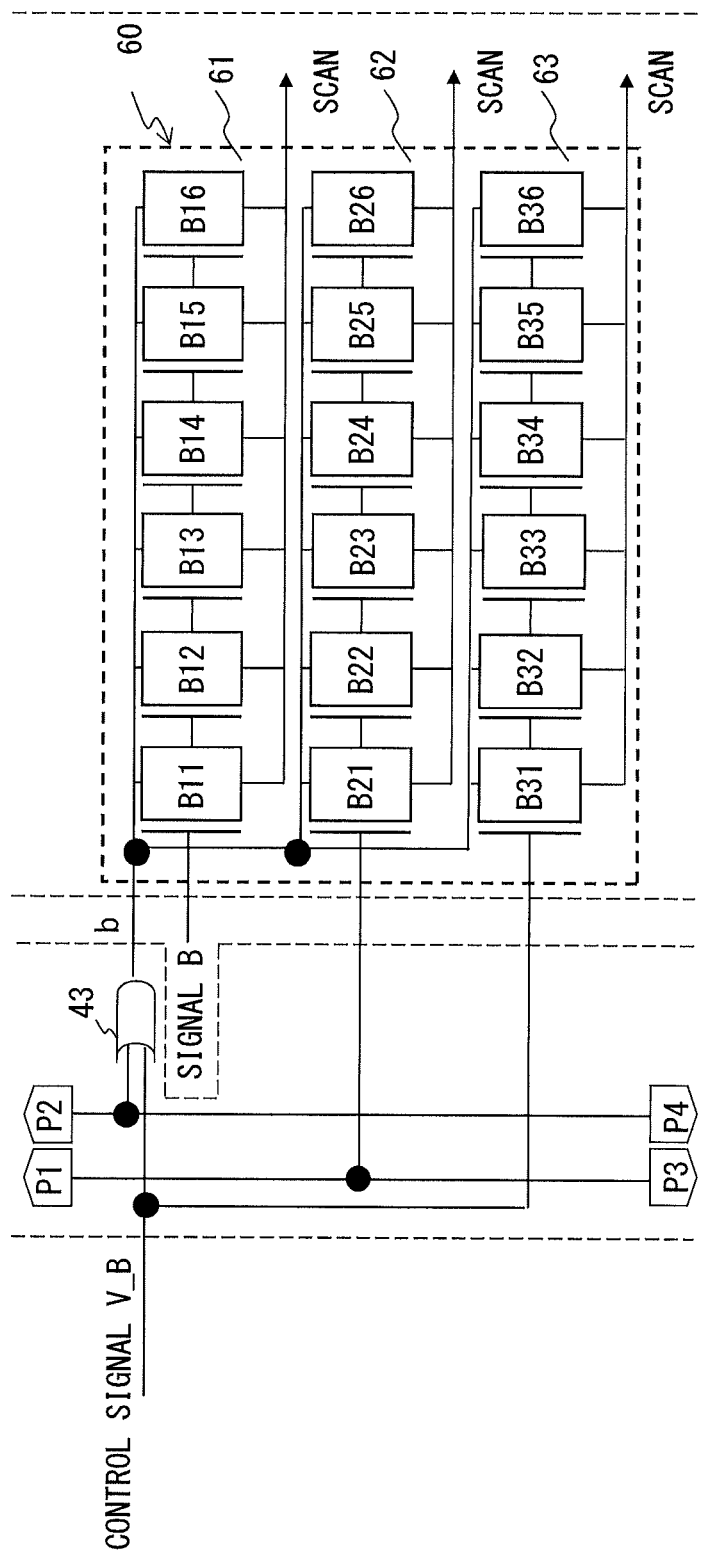
Figure 2C:
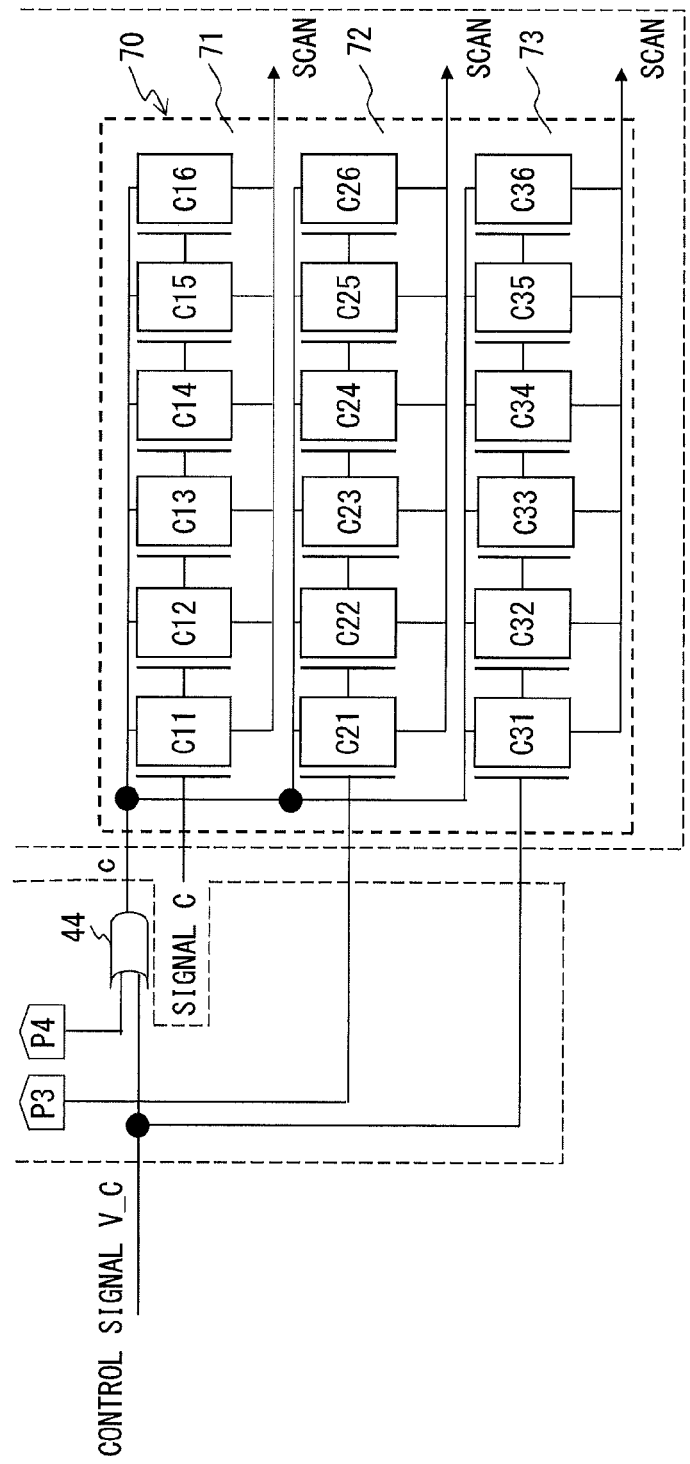

First, FIGS. 2A, 2B and 2C show the configuration according to a preferred embodiment 1 as the configuration of such a debugging mechanism 30.

In the configuration example of the debugging mechanism 30 according to embodiment 1 shown in FIG. 1, first, the debug control unit 31 comprises a counter 41 and individual OR circuits 42, 43 and 44. The counter 41 is operated under the clock CLK, and outputs a counter value that is then input into the debug storage unit 32. This is the same as the related art. The present embodiment is configured to further utilize an overflow signal OVF output from the counter 41. That is, the overflow signal OVF is input into one input terminal of each of the OR circuits 42, 43 and 44. The control signals V_A, V_B and V_C are input into the other input terminals of the OR circuits 42, 43 and 44. Accordingly, the control signals a, b and c, which are outputs of the respective OR circuits 42, 43 and 44, change to "1" not only when the control signals V_A, V_B and V_C are "1", but also when the counter 41 overflows (i.e., the overflow signal OVF changes to "1").

In the description of the present embodiment, "the control signal is valid" when each of the control signal V_A and the like is "1", and "the output of the OR circuit is valid" when the output of each of the OR circuit 42 and the like is "1"; however, configurations of the present embodiment are not limited to the configurations in which a "valid" is indicated only when "1" is indicated.

In comparison with the related art in which the storage units are controlled by the control signals V_A, V_B and V_C, the present embodiment is configured to use the control signals a, b and c, instead. Then, when the counter 41 overflows, the control signals a, b and c are forced to change to "1", regardless of the values of the control signals V_A, V_B and V_C, so that a recording/shift operation is carried out in the debug storage unit 32 at this time. That is, data constituting a checkpoint will be recorded, wherein, when a debugging is carried out later, the check point enables a judgment as to to which cycle (i.e., the nth cycle) each piece of record data belongs. When the control signals V_A, V_B and V_C are "1", a recording/shift operation is carried out in the debug storage unit 32 as a matter or course, as in the conventional technique.

The debug storage unit 32 comprises storage units 50, 60 and 70. The storage unit 50 is the storage unit for recording the operation history of the arithmetic unit 24, and here records a signal A, which is input data to the arithmetic unit 24, together with the counter value. The present embodiment, however, also records a control signal "a". Likewise, the storage unit 60 records the operation history of the arithmetic unit 23, and the storage unit 70 records the operation history of the arithmetic unit 22.

While the storage units 50 through 70 have different data to be input and to store, the configuration per se is the same, and therefore the description here is provided by using the storage unit 50 as representative. The storage unit 50 comprises shift registers 51, 52 and 53. All shift registers 51, 52 and 53 are controlled by the control signal "a" so that the input data is stored/shifted when the control signal "a" is "1". The input data of the shift register 51 is the signal A, that of the shift register 52 is the count value, and that of the shift register 53 is the control signal V_A. The configurations of the individual shift registers per se are the same and therefore the description is provided by exemplifying the shift register 51. The shift register 51 comprises six registers, i.e., registers A11 through A16, and the signal A is first stored in the register A11 and then shifted to registers A12, A13, A14, A15, and A16 in this order, sequentially, and is shifted out in the end. Such storing/shift operations of the signal A are performed every time the control signal changes to "1".

Here, the reason for also recording the control signal V_A unlike the related art, is that, as compared to the related art in which data is recorded only when the control signal V_A is "1" and therefore only valid data is recorded, the present embodiment is configured to store data also when the overflow signal OVF is "1" and therefore the control signal V_A is also recorded in order to make it possible to judge whether the record data is valid or invalid when carrying out a debugging. While all pieces of recorded data are valid in the conventional debugging mechanism, the data constituting the checkpoint is also recorded according to the present method and therefore all pieces of recorded data are not necessarily valid data.

FIGS. 3A through 3C show data stored in the storage units 50 through 70 equipped in the debugging mechanism 30 shown in FIGS. 2A, 2B and 2C described above. Note that the data and the counter value input into the debugging mechanism 30 are the same as those in FIGS. 13A through 13C. Further note that FIGS. 3A through 3C should be interpreted in the same manner as FIG. 14 (according to the present method, however, the values of the control signals V_A, V_B and V_C are recorded).

In the examples shown in FIGS. 3A through 3C, the data stored at the counter value "000" in the first cycle of the counter 41 has already been shifted out and therefore the data stored in the next cycle is the oldest piece of data. In other words, the data is always recorded at the counter value "000" according to the present method, and therefore, if the data at the counter value "000" in the first cycle is not recorded as the oldest piece of data, it is clear that the data has been shifted out.

Further, when it is presumed here that the counter 41 is operated until the second cycle, the data at the counter value "000" in FIGS. 3A through 3C are actually the first pieces of data in the second cycle. Therefore, by defining, as a border, the data stored as the checkpoint, it is possible to judge the data recorded before the border is the data belonging to the first cycle and the data recorded after the border is the data belonging to the second cycle. This makes it clear that, among the recorded data related to the signals A, B and C shown in FIGS. 3A through 3C, all pieces of data positioned to the left of the check point are data contained in the first cycle.

Taking the signal B shown in FIG. 3B as an example, it is clear that all pieces of data of the counter values "010", "011", "100" and "110" are data belonging to the first cycle. Furthermore, the value of the control signal V_B at the counter value "000" is "0", and therefore it is clear that the data is invalid (i.e., the data is recorded as merely a check point) and that all pieces of the record data belonging to the second cycle are the data at the counter value "111".

As described above, the configuration in which data is always recorded at the overflow timing of the counter 41 makes it possible to judge clearly, by scanning the record data shown in FIGS. 3A through 3C, that the operation content (i.e., input values in this case) and the timing of each of the arithmetic units 22 through 24 are as shown in FIG. 4.

The debugging mechanism 30 comprises a scan unit (not shown in a drawing herein) as with the case in, for example, Japanese patent application number 2004-222398, so that the scan unit reads data stored in each of the shift registers.

Next is a description of preferred embodiment 2.

The configuration of embodiment 1 does not bring about a problem if the clock CLK input into the counter 41, i.e., the internal clock of the arithmetic logical unit 20, is stopped immediately after the completion of a test-use arithmetic operation control for the arithmetic units 22 through 24; however, it is possible that the clock CLK advances in association with another control operation, and hence a scan might be performed after the counter 41 undergoes a number of cycles so that the recorded information is read.

In such a case, since data (even if it is invalid data) is always recorded when the counter value is "000" according to the present method as described above, a further piece of data at the counter value "000" will be recorded for each single cycle of the counter 41, in addition to the record data shown in FIG.

3. Consequently, pieces of data are sequentially shifted out starting from the older data, and, as a result, the data stored in the storage units 50, 60 and 70 turn out to be as shown in FIGS. 5A through 5C if a scan is performed after four cycles of the counter 41 following the completion of a test-use arithmetic operation for, for example, the arithmetic units 22 through 24. As shown in FIGS. 5A through 5C, because four extraneous pieces of data at the counter value "000" are recorded, most of the valid data to be primarily stored (i.e., recorded in an actual arithmetic operation) is shifted out and lost, with the result that only two pieces of data remain (i.e., the two pieces of data at the counter values "011" and "111" in the example of FIG. 5A).

Embodiment 2 is the embodiment dealing with a situation in which the above described problem occurs. Incidentally, a configuration is possible in which a control signal is input from the outside of the debugging mechanism 30 (e.g., from the arithmetic control unit 21) to the debugging mechanism 30 in order to stop the counter when a test-use arithmetic operation is completed; however, an additional component and an additional control are required for achieving such a configuration. The debugging mechanism is the configuration added only for a debug and has no relationship with the fundamental operation of the processor 10, and therefore the additional component and the additional control are not desirable. It is accordingly preferable to solve the above described problem within the debugging mechanism 30.

Figure 6A:
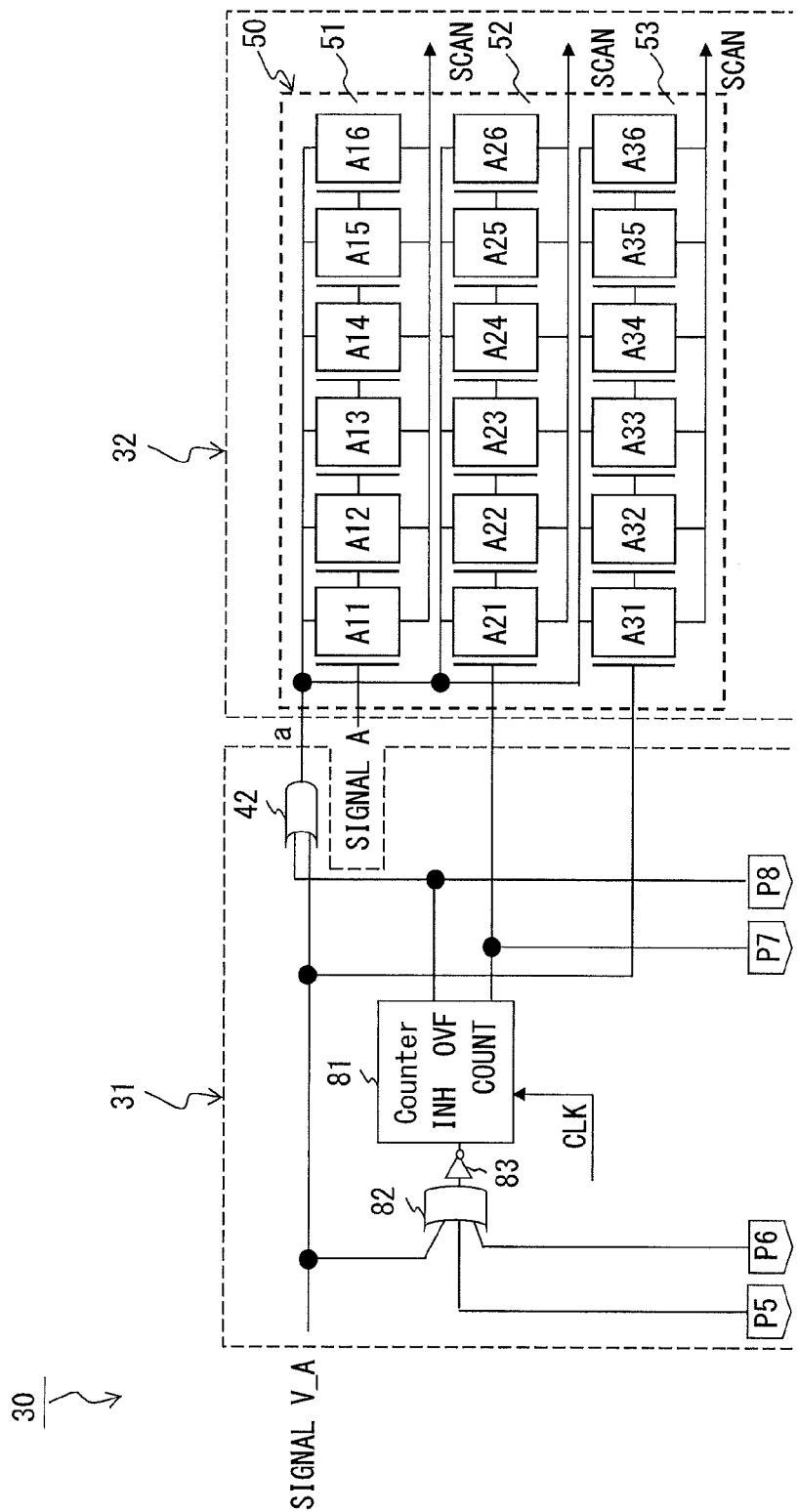
FIGS. 6A, 6B and 6C each exemplify the configuration of a debugging mechanism according to preferred embodiment 2.
Figure 6B:
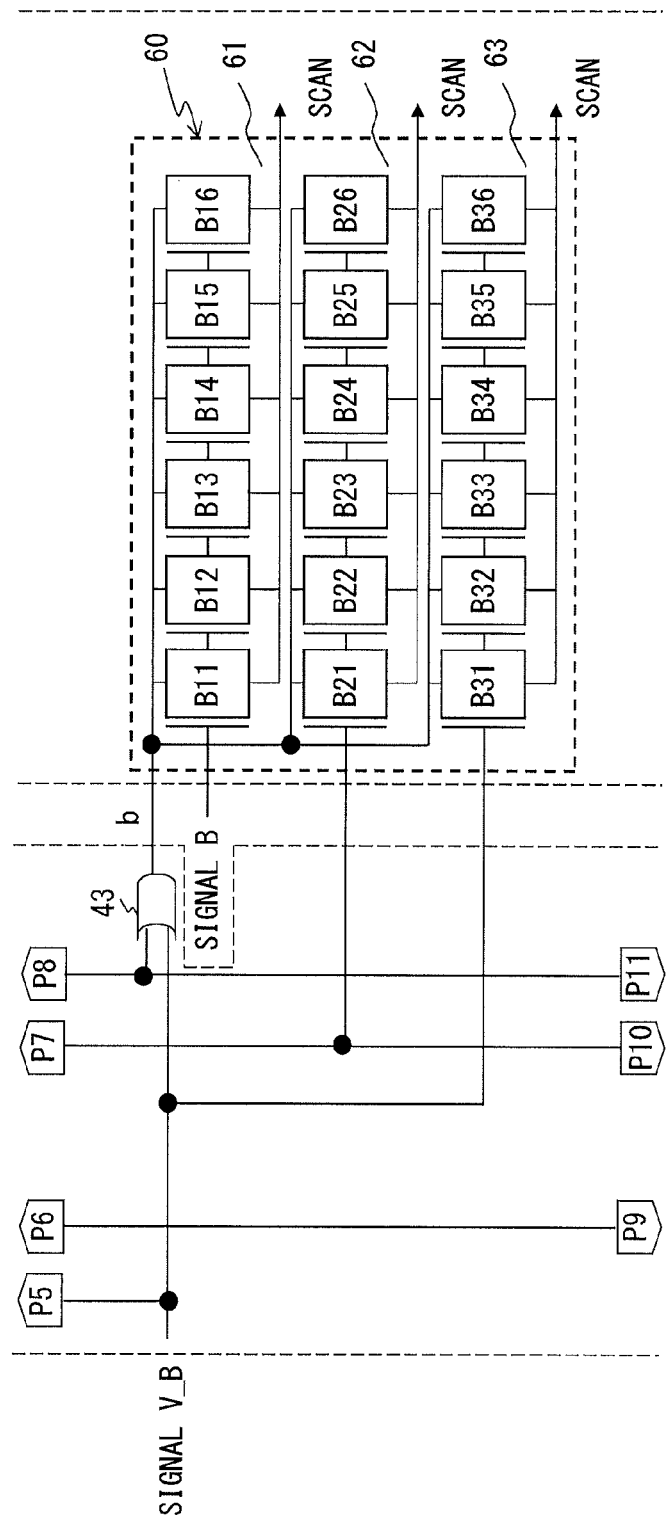
Figure 6C:
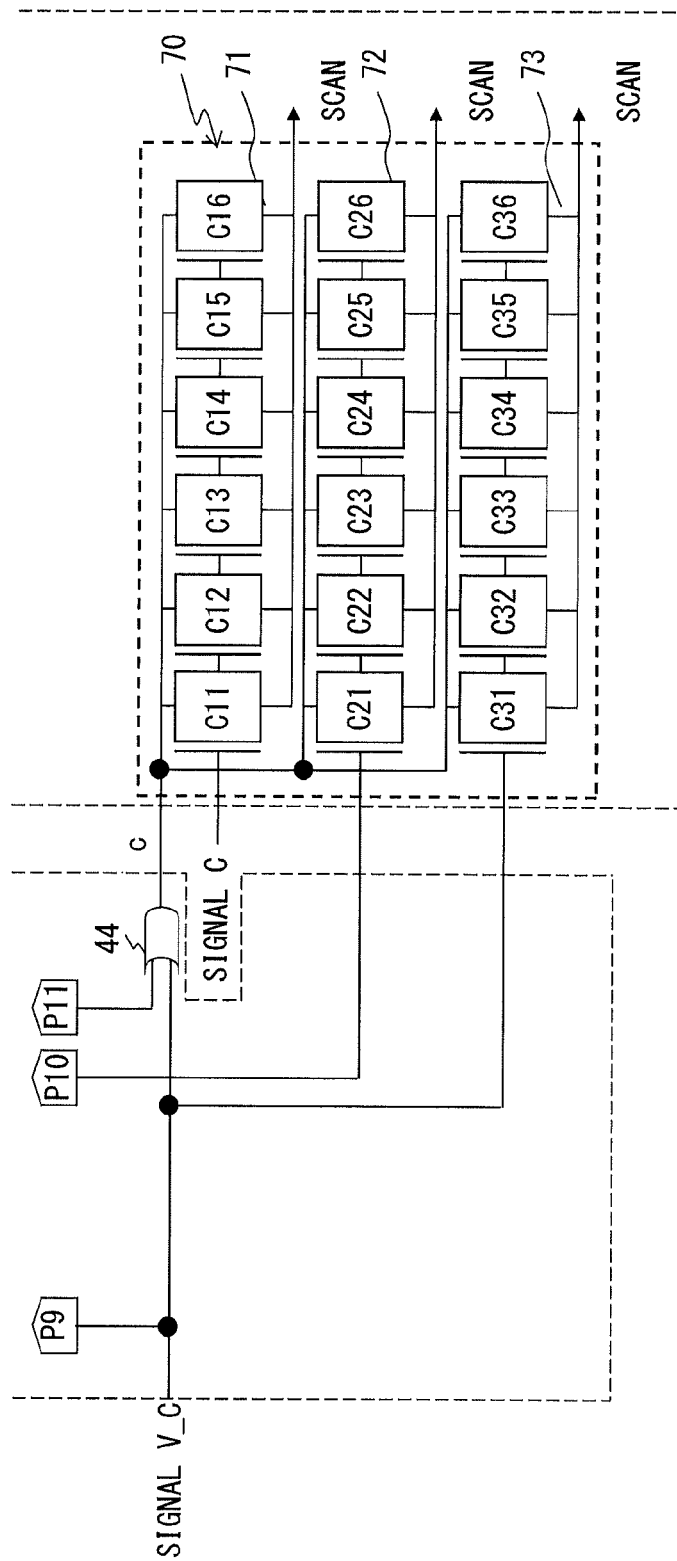

FIGS. 6A, 6B and 6C each exemplify the configuration of a debugging mechanism 30 according to embodiment 2.

In the delineation of FIGS. 6A, 6B and 6C, like parts are indicated by like numerals used in FIGS. 2A, 2B and 2C. First, the configuration of a debug storage unit 32 is the same as that in FIGS. 2A, 2B and 2C (i.e., storage units 50, 60 and 70).

Further, in a debug control unit 31, OR circuits 42, 43 and 44, each of which can receive any of control signals V_A, V_B and V_C as one input and the overflow signal OVF as the other input, are similar to those in FIGS. 2A, 2B and 2C.

The difference between the configuration of FIGS. 6A, 6B and 6C and that of FIGS. 2A, 2B and 2C is that the former comprises, first, a counter 81 that is an INH input terminal-equipped counter, and further, a 3-input OR circuit 82 and a NOT circuit 83. As is widely known, the INH is an inhibit input, so that the counter 81 performs a count-up operation in the usual manner in accordance with a clock CLK when an "L" signal ("0") is input into the INH input terminal, while it does not perform a count-up operation when an "H" signal ("1") is input into the INH input terminal. Further, a signal that is the NOT circuit 83-inverted output of the 3-input OR circuit 83 is input into the INH input terminal in the configuration shown in the drawing.

The inputs to the 3-input OR circuit 83 are the three control signals V_A, V_B and V_C. Therefore, when one or more control signals from among the three control signals V_A, V_B and V_C are "1", the counter 81 of embodiment 2 performs a count-up operation because an "L" signal is input to the INH input terminal, enabling the counter. In contrast, when all of the three control signals V_A, V_B and V_C are "0", the counter 81 does not perform a count-up operation because an "H" signal is input to the INH input terminal. Further, all of the control signals V_A, V_B and V_C turn to "0" upon completion of the test-use arithmetic operation and therefore the counter 81 never performs a count-up operation even if the clock CLK advances.

FIG. 7 shows the operation timing of the counter 81 according to embodiment 2 (where the input data is the same as in FIG. 13).

When all of the three control signals V_A, V_B and V_C are "0", the counter 81 does not perform a count-up operation as shown in FIG. 7 (the blanks in the drawing mean that the counter value does not change). When all of the three control signals V_A, V_B and V_C are "0", a storing/shifting operation of new data is of course not carried out in any of the three storage units 50, 60 and 70. When the counter 81 operates as shown in FIG. 7, the content of data stored in each of the storage units 50, 60 and 70 is as shown in FIGS. 8A through 8C. When comparing FIGS. 8A through 8C with FIGS. 3A through 3C, they are approximately the same; the only difference is in the counter values.

Then, even if the situation arises in which the clock CLK does not stop as described above immediately after recording the last piece of data (i.e., the data at the counter value "011" in the second cycle) shown in FIG. 7, all of the three control signals V_A, V_B and V_C are "0" at the completion of a test and accordingly the counter 81 does not perform a count-up operation. Therefore, the counter value of the counter 81 remains at "011" thereafter so that no new piece of data of a check point will be recorded in any of the three storage units 50, 60 and 70. This in turn causes the data read out by scanning thereafter to be the same as the data shown in FIGS. 8A through 8C, and thus the above described problem is solved.

FIG. 9 shows the operating order of individual arithmetic units judged from the record data shown in FIGS. 8A through 8C.

Even if the counter value is different from that of FIG. 3, a relative operating order of the individual arithmetic units can be judged without a problem as shown in FIG. 9. The execution interval (i.e., a cycle interval) of the individual arithmetic operation of the arithmetic unit for each of them, however, is not known. Incidentally, it appears that the execution interval of individual arithmetic operations for each arithmetic unit is seemingly understood also in FIG. 9. For example, in regard to signal A (i.e., in regard to the arithmetic unit 24), the execution interval between the operation at the timing of the count value "000" in the second cycle and that at the timing of the count value "011" in FIG. 9 is seemingly understood as equivalent to three cycles on the clock CLK. As correctly shown in FIG. 4, however, the execution interval between the two operations noted above is equivalent to four cycles on the clock CLK, and thus a reference to FIG. 9 leads to an erroneous judgment.

The following is a description of preferred embodiment 3.

As described above, if a clock CLK cannot be stopped immediately after the completion of a test-use arithmetic operation, the configuration according to embodiment 1 allows the information stored with effort to be shifted out and lost.

In contrast, embodiment 2 is capable of solving the problem of the above described embodiment 1, and yet a mere reference to the recorded counter value will not provide an understanding of the execution interval (i.e., the cycle interval) of the individual arithmetic operation for each arithmetic unit.

This problem is not a matter of which of the embodiments 1 and 2 is superior (or inferior). Rather, the viable solution is to use either of the embodiments 1 and 2 (i.e., whichever is suitable to the situation) selectively in accordance with the situation.

Preferred embodiment 3 is accordingly configured to enable a changeover between the two control methods, i.e., the methods of embodiments 1 and 2, by means of an externally input mode signal, thereby enabling a debugging in accordance with the situation.

FIG. 10 exemplifies the configuration of a debugging mechanism 30 according to embodiment 3.

As shown in the drawing, the configuration in FIG. 10 is approximately the same as that in FIGS. 6A, 6B and 6C (i.e., embodiment 2), and like parts are indicated by like numerals used in FIGS. 6A, 6B and 6C. The following description is provided for only the different aspects. Note that the configuration of a debug storage unit 32 is the same as the configurations in FIGS. 2 and 6, and therefore it is not provided in FIG. 10, thus showing only the configuration of a debug control unit 31.

The configuration in FIG. 10 differs from that in FIGS. 6A, 6B and 6C in that the former is equipped with a NOR circuit 91 in place of the NOT circuit 83 comprised in the configuration in FIGS. 6A, 6B and 6C. The output of a 3-input OR circuit 82 is input into one input terminal of the NOR circuit 91, and a MODE signal, which is externally input into the debugging mechanism 30, is input into the other input terminal of the NOR circuit 91. Note that the MODE signal may be generated and output by an instruction control unit 11 in accordance with an external instruction of, for example, a processor 10. Such a configuration is arbitrary, and hence the MODE signal may be generated by a certain control unit within the processor 10 or may be generated in an arithmetic logical unit 20.

The NOR circuit 91 outputs "1" only when both of the two inputs are "0". Therefore, if a use of the control method of embodiment 1 is desired, the MODE signal merely needs to be turned to "1". If the MODE signal is "1", the output of the NOR circuit 91 always turns to "0" (i.e., an "L" signal ("0") is always input to the INH input terminal of the counter 81) regardless of the output of the OR circuit 82 (that is, regardless of the values of the control signals V_A, V_B and V_C).

In the meantime, if a use of the control method of embodiment 2 is desired, the MODE signal is merely to be turned to "0". In this case, if the output of the OR circuit 82 is "0", that is, if all of the control signals V_A, V_B and V_C are "0", then the output of the NOR circuit 91 turns to "1" and thus an "H" signal ("1") is input to the INH input terminal of the counter 81. In this state, the counter 81 does not perform a count-up operation even if the clock CLK advances as described above. It is, however, clear that the output of the NOR circuit 91 turns to "0" when any one or more of the control signals V_A, V_B and V_C are "1".

Lastly, a modified embodiment of the present embodiment will be described.

The above described embodiments 1, 2 and 3 are configured to record a check point at the timing of the counter overflowing (i.e., count value "000"); however, the configuration is arbitrary. For example, an arbitrarily pre-specified specific timing may be used for a check point.

Figure 11:
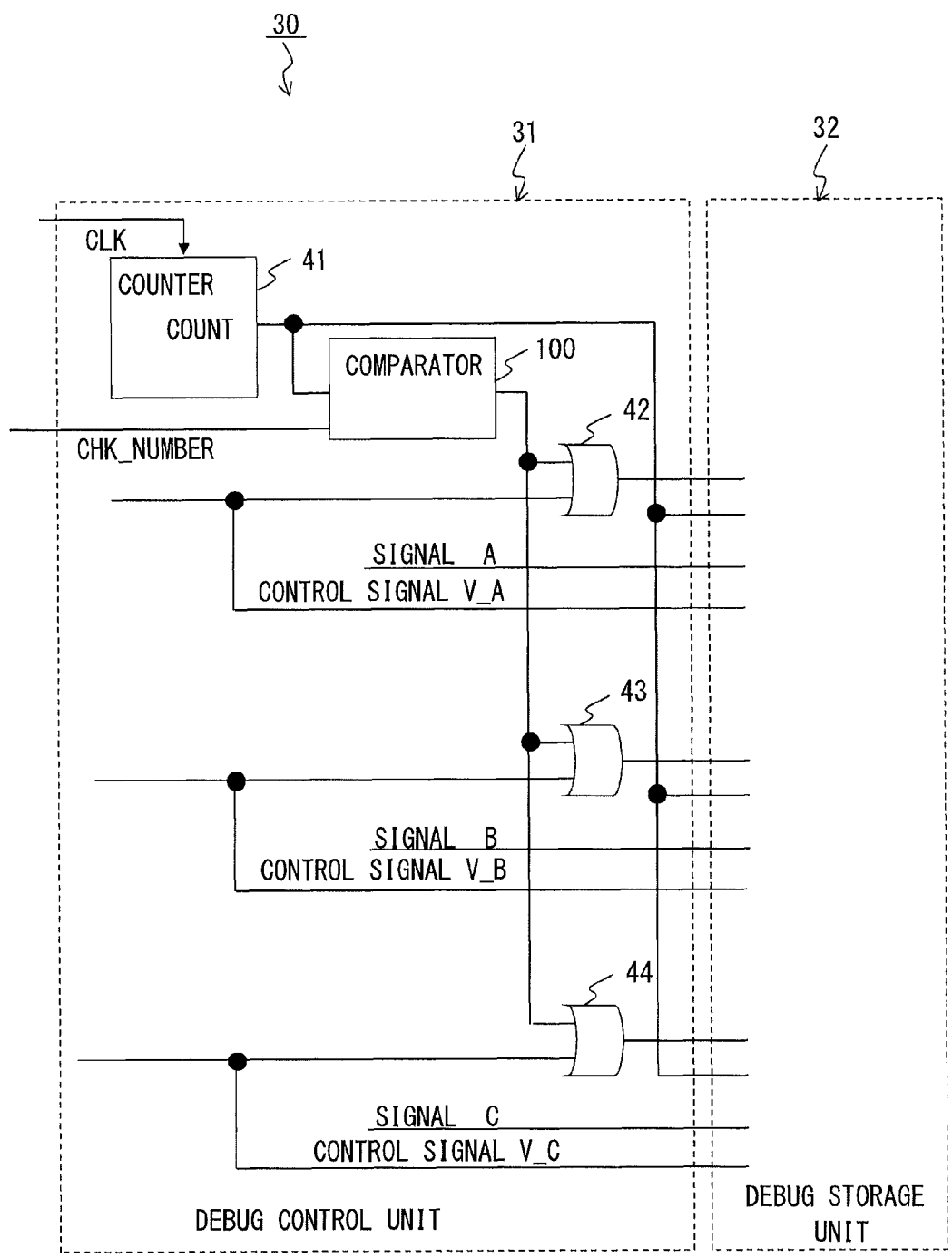
FIG. 11 exemplifies the configuration of a debugging mechanism according to a modified example of embodiment 1.

FIG. 11 exemplifies the configuration of such a modified embodiment.

In the modified embodiment, the configuration of a debug storage unit 32 is the same as the configurations in FIGS. 2A, 2B and 2C and the like, and therefore it is not provided in FIG. 11, while only the configuration of a debug control unit 31 is shown in FIG. 11.

FIG. 11 shows the modified embodiment corresponding to embodiment 1 (refer to FIGS. 2A, 2B and 2C), and accordingly like parts are indicated by like numerals used in FIGS. 2A, 2B and 2C (the difference is that the overflow signal OVF of the counter 41 is not used as an input to the individual OR circuits 42, 43 and 44). The following description will be provided for only the aspects that are different from the configuration in FIGS. 2A, 2B and 2C.

The configuration in FIG. 11 differs from that in FIGS. 2A, 2B and 2C in that the former is equipped with a comparator 100, as shown in the figure. A counter value output from the counter 41 is input to one input terminal of the comparator 100 and a CHK_NUMBER signal is input to the other input terminal thereof, as shown in the figure. As in the case of the MODE signal, the CHK_NUMBER signal, externally input into the debugging mechanism 30, allows free changing of the settings from the outside. The comparator outputs "1" only when the two input values are identical. The output of the comparator 100 is a single input to each of the OR circuits 42, 43 and 44. That is, the present modified embodiment is configured to use the output of the comparator 100 in place of the overflow signal OVF shown in FIGS. 2A, 2B and 2C. Then, if, for example, CHK_NUMBER "101" is set, the output of the OR circuits 42, 43 and 44 will be "1" without fail when the counter value of the counter 41 is "101", so that the data at this timing is recorded as a check point in the debug storage unit 32.

Note that the configuration, as shown in FIG. 11, of using the output of the comparator 100 in place of using an overflow signal OVF can also be applied to embodiments 2 and 3.

Note further that each of the above described embodiments, including the configuration in FIG. 1, is configured to use, as input data (i.e., the signals A, B and C) to the arithmetic units 22 through 24, data to be stored in the debug storage unit 32 as the data indicating the arithmetic operation of each arithmetic unit; however, such a configuration is arbitrary. An alternative configuration may be a configuration to record, for example, the output data (i.e., arithmetic operation results) from the arithmetic units 22 through 24. In this case, the output signal lines from the arithmetic units 22 through 24 are of course connected to the debug storage unit 32. Alternatively, both the input data and the output data may be recorded.

Note also that the embodiments described above have exemplified a shift register as the specific example of the debug storage unit 32; however, the example is arbitrary. The debug storage unit 32 may be random access memory (RAM) or the like. In any case, however, the storage capacity of the storage unit 32 is small. The reason is that a debugging mechanism is added for the purpose of testing and is not needed for an actual operation and thus the debugging mechanism may not be equipped with a large capacity storage unit (because other circuits would be pressured). A similar consideration is necessary for the counter for which the use of a large-bit counter prevents the above described problem (i.e., the problem of being unable to discern as to to which cycle (i.e., the nth cycle) the counter value belongs, due to using the counter cyclically). Actually, however, there is no room for equipping a debugging mechanism with a large scale counter, as in the case of the storage unit.

Note further that the counter used in the above described embodiments is configured to perform a count-up operation; however, the counter may of course be configured to perform a count-down operation.

As described above, the debugging mechanism according to the present embodiment makes it possible to record the operation history of each arithmetic unit so as to judge clearly the execution order and cycle interval of each arithmetic unit or a relative execution order of a plurality of arithmetic units.

What is claimed is:

1. A debugging circuit that receives arithmetic operation data for causing an arithmetic unit provided within a processor to perform an arithmetic operation, and a control signal used for the arithmetic operation, the debugging circuit comprising:

a counter that counts cyclically in response to an internal clock of the processor and outputs a counter value;

an OR circuit that receives the control signal and a counter signal that is output when the counter value becomes a specific value, and outputs an output signal generated by performing a logical OR operation of the control signal and the counter signal; and a debug storage unit that stores the arithmetic operation data, the counter value, and the control signal when the output signal of the OR circuit is valid, wherein the control signal indicates whether or not the arithmetic operation data is valid.

2. The debugging circuit according to claim 1, wherein said counter signal that is output when the counter value of said counter is the specific value is an overflow signal output from the counter.

3. The debugging circuit according to claim 1, wherein said counter signal that is output when the counter value of said counter is the specific value is the output of a comparator receiving inputs of a counter value output from the counter and said specific value.

4. The debugging circuit according to claim 1, wherein said counter outputs the counter value when the control signal is valid.

5. The debugging circuit according to claim 1, wherein said counter operates synchronously with said arithmetic operation, or operates when the control signal is valid, in accordance with an externally input mode signal.

6. The debugging circuit according to claim 1, wherein the counter outputs the counter value synchronously with the arithmetic operation.

7. A processor comprising:

a data control unit that provides arithmetic operation data;

an arithmetic control unit that outputs a control signal and the arithmetic operation data;

an instruction control unit that controls the arithmetic control unit;

an arithmetic unit that executes a prescribed arithmetic operation using the control signal and the arithmetic operation data;

a counter that counts cyclically in response to an internal clock of the processor and outputs a counter value;

an OR circuit that receives the control signal and a counter signal that is output when the counter value becomes a specific value, and outputs an output signal generated by performing a logical OR operation of the control signal and the counter signal; and a debug storage unit that stores the arithmetic operation data, the counter value, and the control signal when the output signal of the OR circuit is valid, wherein the control signal indicates whether or not the arithmetic operation data is valid.

* * * * *